(12) United States Patent
Sano

(10) Patent No.: US 8,668,112 B2
(45) Date of Patent: Mar. 11, 2014

(54) HOLE-SEALING COVER

(75) Inventor: Takahiro Sano, Aichi-Prefecture (JP)

(73) Assignee: Newfrey LLC, Newark, DE (US)

( * ) Notice: Subject to any disclaimer, the term of this patent is extended or adjusted under 35 U.S.C. 154(b) by 827 days.

(21) Appl. No.: 12/109,447

(22) Filed: Apr. 25, 2008

(65) Prior Publication Data

US 2008/0284111 A1 Nov. 20, 2008

(30) Foreign Application Priority Data

May 16, 2007 (JP) .................................. 2007-130189

(51) Int. Cl.
*B65D 43/26* (2006.01)
(52) U.S. Cl.
USPC ......................................................... 220/787
(58) Field of Classification Search
USPC ......... 220/787, 789, 791, 793, 264, 801, 803, 220/572
See application file for complete search history.

(56) References Cited

U.S. PATENT DOCUMENTS 3,851,794 A * 12/1974 Hehl .............................. 220/789
4,360,119 A * 11/1982 Olivo ............................ 220/522
4,413,748 A * 11/1983 Kessler et al. ................ 220/281

FOREIGN PATENT DOCUMENTS

JP 5-7503 2/1993
JP 2000-238662 9/2005

* cited by examiner

*Primary Examiner* — Steven A. Reynolds
*Assistant Examiner* — King M Chu
(74) *Attorney, Agent, or Firm* — Michael P. Leary

(57) ABSTRACT

Hole-sealing cover wherewith, while securing space for a moving part such as the end of a suspension arm, the size of a hole in a member being attached to can be made small. The hole-sealing cover is shaped so that it can be inserted into a hole in a bracket, includes a vessel-shaped main cover body which has a space for an end to move in formed inside, and a flange, formed at the peripheral edges of the main cover body, for preventing excessive insertion, in which main cover body, at the top part thereof forming a vessel-shaped bottom surface, a hinge is formed which extends, crossing the top part linearly, which hinge exhibits elasticity wherewith the width in a direction crossing the hinge can be reduced by a pressing force and wherewith the width is restored to the original width when the pressing force is released.

19 Claims, 6 Drawing Sheets

HOLE-SEALING COVER

CROSS-REFERENCE TO RELATED APPLICATION

This application claims the priority of Japanese Patent Application No. 2007-130189, filed May 16, 2007, the disclosure of which is incorporated herein by reference.

TECHNICAL FIELD

This invention relates to a hole-sealing cover, and more specifically to a hole-sealing cover that, when a part that moves during travel, such as an automobile suspension arm, is attached to a member being attached to such as an automobile body, is suitable for sealing a hole formed in the member being attached to so as not to impede the movement of that part, and so as to prevent the intrusion of foreign matter such as dirt, while securing space for the movement of that part.

BACKGROUND OF THE INVENTION

In FIG. 9, a conventional hole-sealing cover is diagrammed which, when a part that moves during travel such as an automobile suspension arm is attached to a member being attached to such as an automobile body, is suitable for sealing a hole formed in the member being attached to so as not to impede the movement of that part, and so as to prevent the intrusion of dirt or other] foreign matter or the like while securing space for the movement of that part. A bracket 3, to which the end 2 of a suspension arm is movably attached, is secured to an automobile body 1. In the bracket 3, a hole 5 is formed so as to permit the movement of the end 2 of the suspension arm represented by the solid-line and a plurality of broken-line outlines. Because the hole 5 is widely opened so as not to impede the movement of the end 2 of the suspension arm, dirt and other foreign matter will intrude inside the hole 5. For that reason, a cover 6 is attached to the bracket 3 so as to seal the hole 5. The cover 6 secures movement space 7 inside the hole 5 so that the movement (indicated by the solid line and the plurality of broken lines) of the end 2 of the suspension arm is not impeded. The movement space 7 is formed of such size as to have a surface area corresponding to the size of the hole 5 and of such depth that the movement of the end 2 is not impeded.

In published Japanese utility model patent JP H5-7503 U, a configuration is described for a hole-sealing cover, formed as a basket-shaped bracket for attaching an attaching part of the end of a suspension arm, which cover is formed in a concave shape exhibiting some degree of elasticity, and is attached to a bracket while securing the movement of the suspension arm end. The conventional cover 6 diagrammed in FIG. 9 and the cover described in JP H5-7503 U seal such a hole while securing space for the movement of the part, prevent the intrusion of dirt and other foreign matter and the like inside the bracket, without impeding the movement of the part, and prevent soiling damage and corrosion and the like in the bracket and adjacent body parts.

The conventional cover described above seals a hole formed in a member being attached to such as a bracket secured to an automobile body so as to prevent the intrusion of dirt and other foreign matter while securing space for the movement of the part. With such a cover, however, because it is formed of such size as not to impede the movement of the part, the attachment hole inevitably becomes large, and, when the hole becomes large, the rigidity of the bracket attached to declines. Accordingly, a hole-sealing cover is desired wherewith the size of the attachment hole can be made small while securing space for the moving part.

In published Japanese patent applications JP2000-238622 A and JP2004-306630 A, structures for securing the end of a suspension trailing arm are described. In JP2000-238622 A, a structure is described for maintaining strong rigidity in the end of a trailing arm against vibration from a rear wheel, for example, the use of an inverted vessel-form hat-shaped bracket for sealing a hole being also described therein. In JP2004-306630 A, a durable structure is described wherewith the end of a trailing arm is supported so that the generation of noise can be prevented. In JP2000-238622 A and JP2004-306630 A, however, there is no description of a cover for sealing a hole without impeding the movement of the end of a suspension arm.

An object of the present invention is to provide a hole-sealing cover wherewith, while securing space for a moving part such as the end of a suspension arm, the size of the hole in a member being attached to such as an automobile body or bracket can be made small.

SUMMARY OF THE INVENTION

According to one aspect, the present invention may provide a hole-sealing cover suitable for receiving a moving part such as the end of an automobile suspension arm in a hole formed in a member being attached to such as an automobile body and, while securing space for the member to move, sealing the hole so as to prevent the intrusion of foreign matter such as dirt from the hole, comprising: a vessel-shaped main cover body of a shape that can be inserted in the hole in the member being attached to, having a space formed on the inside thereof for the member to move in; and a flange formed at the peripheral edge of an opening, having the vessel shape, in the main cover body, for preventing the main cover body from being excessively inserted into the hole; wherein: in the main cover body, in the portion forming a bottom surface having the vessel shape, a hinge is formed which extends linearly, crossing that bottom surface; and that hinge exhibits elasticity wherewith the width in a direction crossing the hinge can be reduced by a pressing force from the crossing direction toward that hinge, and wherewith the width is restored to the original width when the pressing force is released.

Based on the hole-sealing cover described above, because the hinge of the main cover body exhibits elasticity wherewith the width in a direction crossing the hinge can be reduced by a pressing force from the crossing direction toward that hinge, and wherewith the width is restored to the original width when the pressing force is released, the width in the crossing direction can be made larger than the width of the attachment hole in the member being attached to and the inside of the main cover body can be made the same size or a larger size than the width of the attachment hole, and the width of the main cover body can be reduced to permit insertion when inserting it in the hole in the member being attached to, whereupon the main cover body will return to its original width when the pressing force ceases after attachment, and space for a moving part such as the end of a suspension arm is secured. As a consequence, space for the movement of the moving part can be secured, even if the hole in a member being attached to such as an automobile body or bracket is made small, whereupon the rigidity of the member being attached to can be prevented from declining.

In the hole-sealing cover described above, the hinge may be formed of a thinner material than are the other portions of the main cover body, and the elasticity noted earlier is imparted thereto. The hole in the member being attached to may be formed in a substantially rectangular shape, moreover. The main cover body may be formed in a vessel shape, as viewed externally, that is shaped substantially as a rectangular parallelepiped, for sealing the rectangular hole. The hinge is formed so as to extend parallel to the long sides of the rectangular parallelepiped, substantially across the center of the bottom surface. The main cover body may be made so that, when the pushing force is not operative, the width on the inside in the direction of the short sides of the rectangular parallelepiped is formed larger than the width in the direction of the short sides of the hole in the member being attached to. Long narrow undercuts are formed between the flange and the end edges of the long sides of the main cover body, and the end edges of the long sides of the main cover body adjacent to the undercuts are formed as latching shoulders which latch to the edges of the hole in the member being attached to. In the inner wall surfaces of the portion of the main cover body where the latching shoulders are formed, ribs are formed for reinforcing those latching shoulders. The hinge extends beyond the portion forming the bottom surface of the vessel shape, and may extend as far as a position adjacent to the flange formed in the peripheral edges at the end edges of the main cover body. The cover is integrally molded of a hard resin material.

DETAILED DESCRIPTION OF EXEMPLARY EMBODIMENTS OF THE INVENTION

Figure 1:
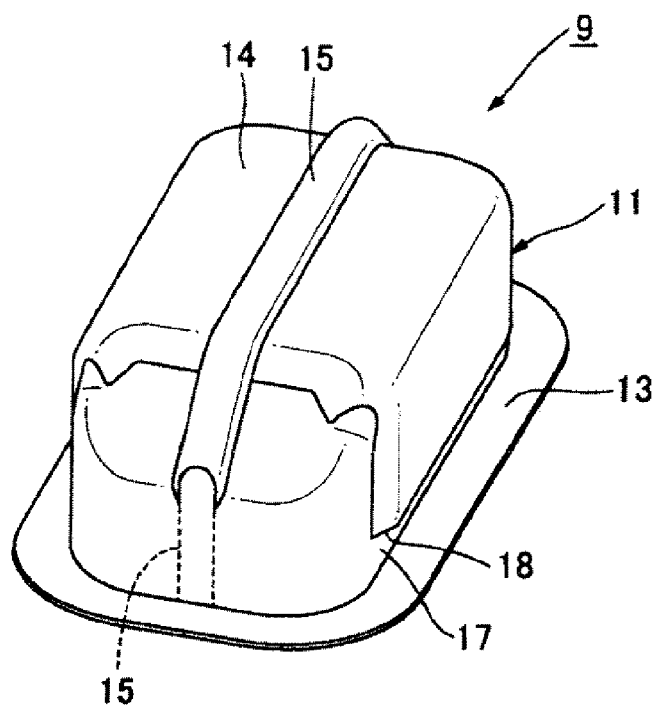
FIG. 1 is a diagonal view of a hole-sealing cover relating to one embodying mode of the present invention.
Figure 2:
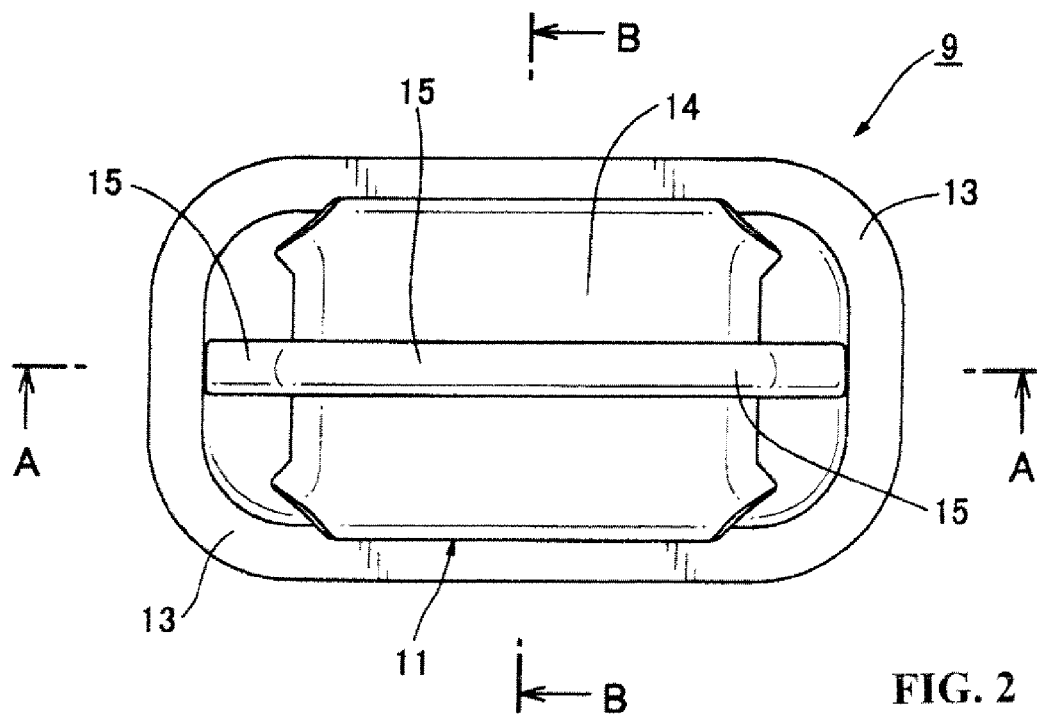
FIG. 2 is a plan of the cover diagrammed in FIG. 1.
Figure 3:
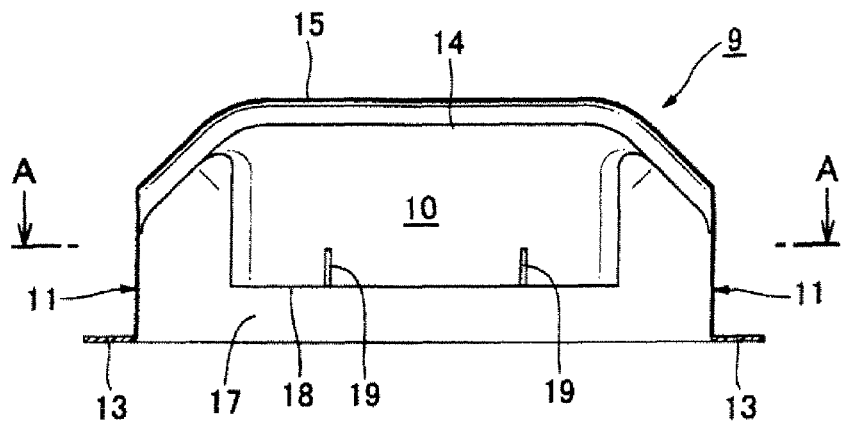
FIG. 3 is a section at the A-A line of the cover diagrammed in FIG. 2.
Figure 4:
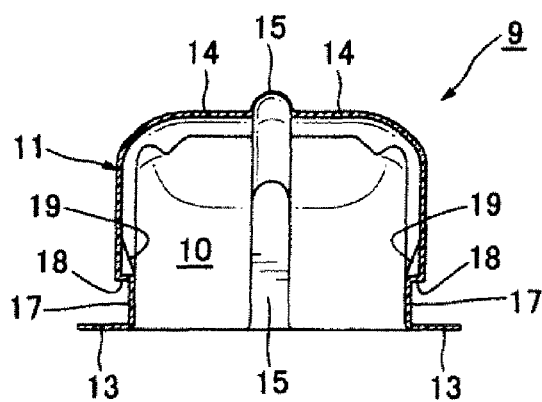
FIG. 4 is a section at the B-B line of the cover diagrammed in FIG. 2.
Figure 5:
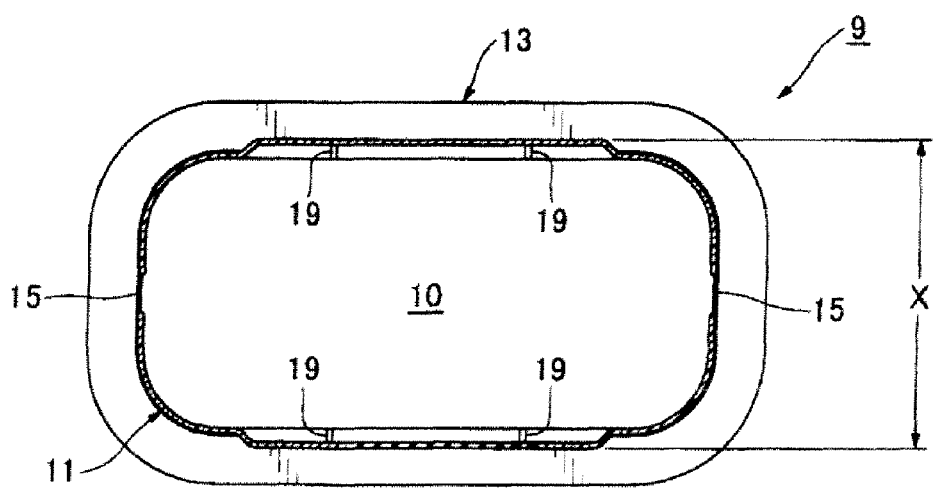
FIG. 5 is a section at the A-A line of the cover diagrammed in FIG. 3.
Figure 6:
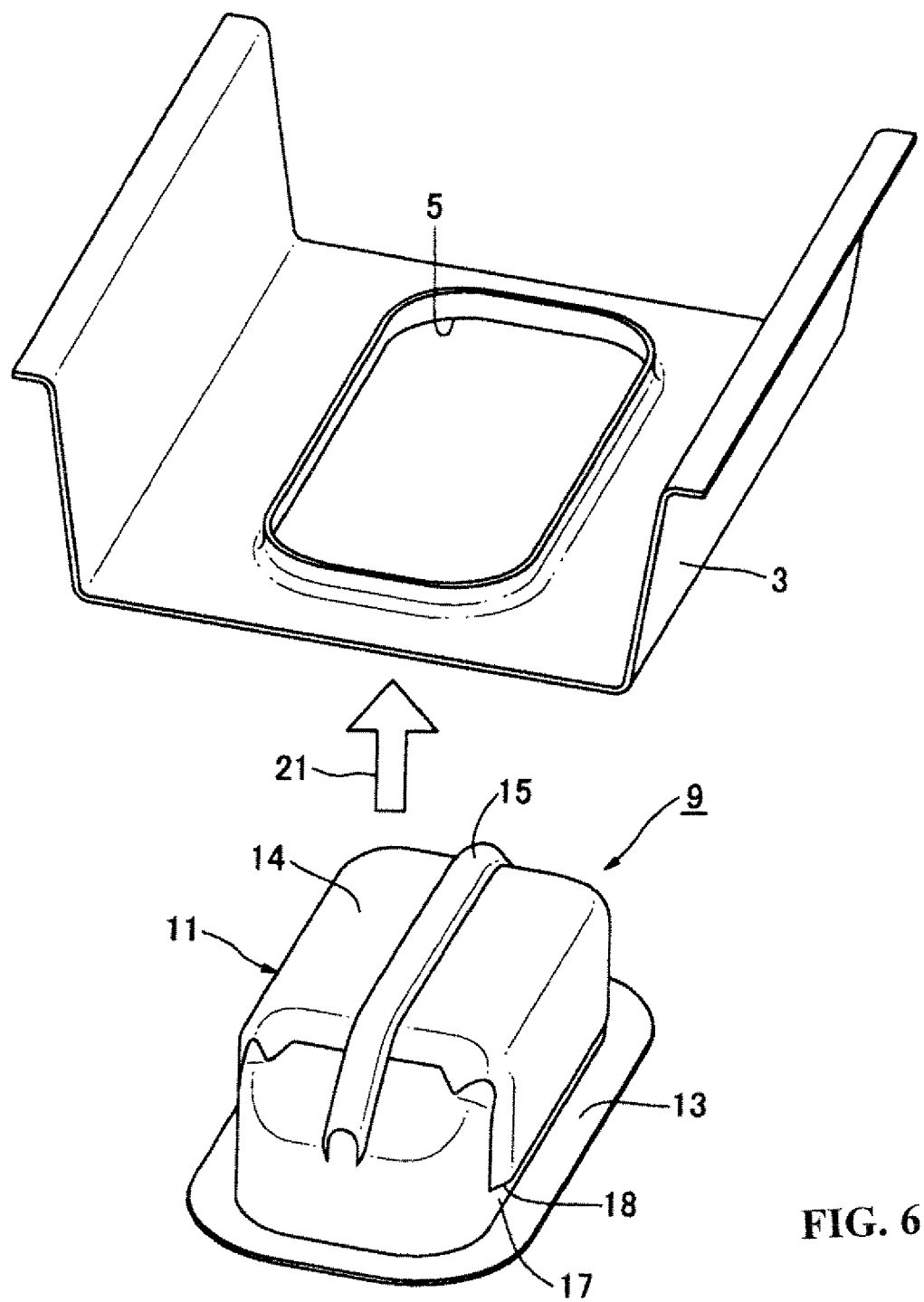
FIG. 6 is a diagonal view depicting the operation of attaching the cover diagrammed in FIG. 1 to a bracket secured to an automobile body.
Figure 7:
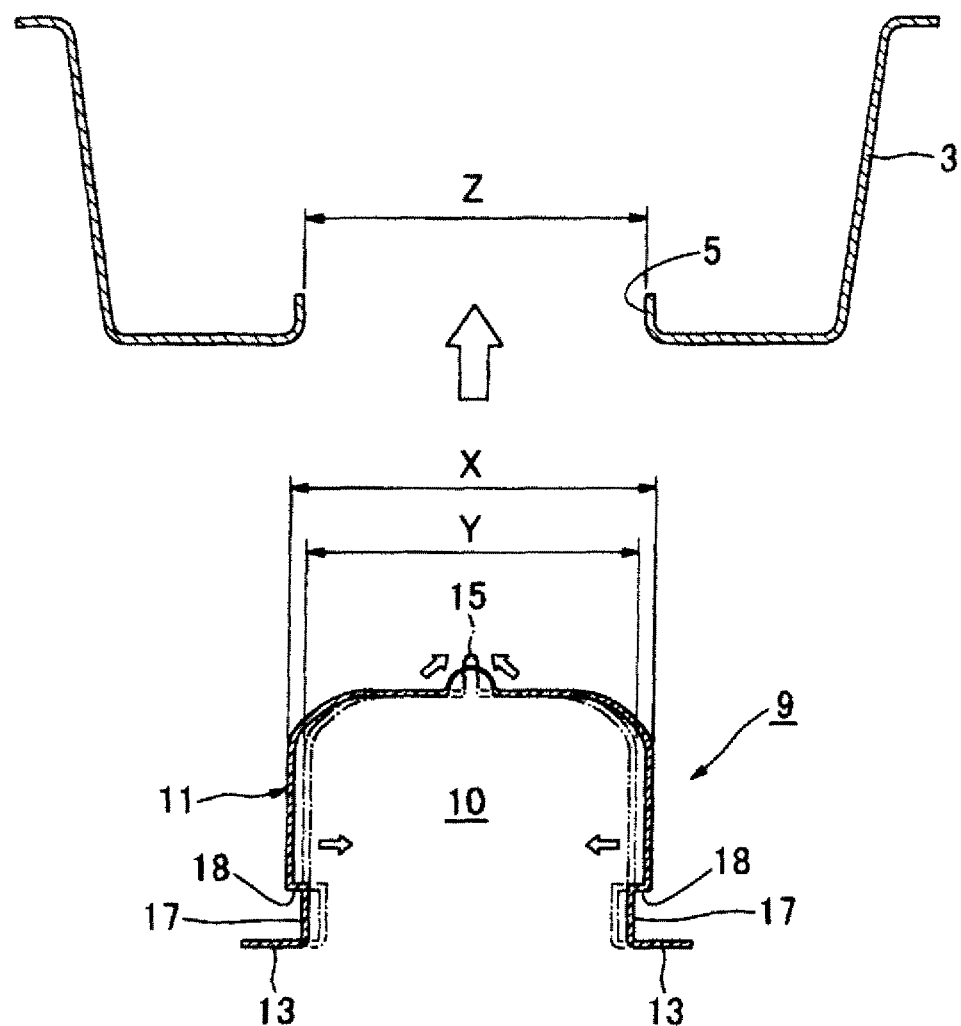
FIG. 7 is a section showing the relationship between the bracket and the cover diagrammed in FIG. 6.
Figure 8:
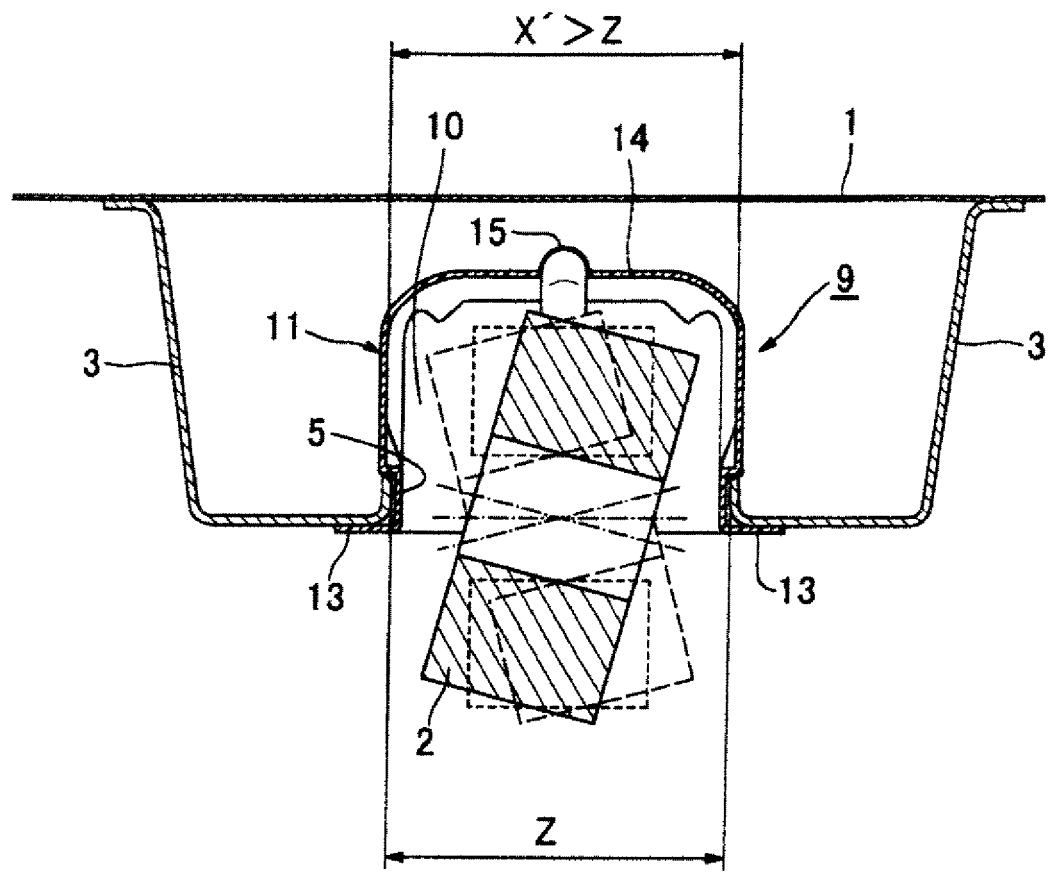
FIG. 8 is a section showing how the cover diagrammed in FIG. 1 is attached to a bracket secured to an automobile body.

A hole-sealing cover relating to one exemplary embodiment of the present invention is now described with reference to the drawings. FIG. 1 to 5 diagram a hole-sealing cover 9, relating to one embodiment of the present invention, by itself. FIGS. 6 and 7 diagram how the hole-sealing cover 9 is attached to an attachment hole 5 in a bracket 3 that is the member being attached to and that is secured to an automobile body (not shown). FIG. 8 diagrams the condition wherein a moving part such as the end 2 of a suspension arm, for example, is accommodated, such that the movement thereof is not impeded, in a space 10 inside the hole-sealing cover 9 which is attached to the bracket 3 secured to the automobile body 1.

The configuration of the hole-sealing cover 9 is now described in greater detail, with reference to FIG. 1 to 5. The hole-sealing cover 9 is integrally molded of a hard resin material exhibiting a certain rigidity. The hole-sealing cover 9 relating to the exemplary embodiment is designed such that when a part that moves during travel, such as the end 2 of an automobile suspension arm, is attached to a member being attached to such as a bracket 3 secured to the automobile body, for sealing a hole formed in the member being attached to so as not to impede the movement of that part, and so as to prevent the intrusion of dirt and other foreign matter, while securing space for the part to move. The hole-sealing cover 9 relating to the exemplary embodiment diagrammed in the drawings seals a substantially rectangular hole 5 in the bracket 3 diagrammed in FIG. 6. In the hole-sealing cover 9, on the inside, the space 10 is formed, whereupon the end 2 of the suspension arm can be accommodated, and space for the end 2 to move is secured.

The cover 9 is of a shape that can be inserted into the hole 5, and comprises a main cover body 11, shaped as a vessel such as a cup, which forms the space 10 for the end 2 to move on the inside, and a flange 13 formed, so as to extend outward, in the peripheral edges of the vessel opening end part of the main cover body 11. The flange 13 prevents the main cover body 11 from being excessively inserted into the hole 5 of the bracket 3. In the exemplary embodiment diagrammed in the drawings, the main cover body 11 is matched with the substantially rectangular hole 5 of the bracket 3, and is formed in a vessel shape, as viewed externally, that is substantially rectangular parallelepiped in shape, which both seals that hole 5 and forms the space 10 so as not to impede the movement of the moving part on the inside. Describing this in even greater detail, as diagrammed in FIGS. 1, 3, and 4, the main cover body 11 is formed overall in a rectangular dome shape, with the top part 14 that forms the bottom surface of the vessel being formed so as to slant on both sides in the direction of the long sides. The flange 13 is formed so as to extend slightly to the outside in order to prevent the excessive insertion of the main cover body 11 into the hole 5 and so as to seal the hole 5. The outward extension of the flange 13 may be small so long as it is sufficient to seal the hole 5. The space 10 should preferably be formed of a small size, so long as that does not impede the movement of the end 2 of the suspension arm that is the moving part, whereupon the hole in the member being attached to can also be made small, and loss of rigidity in the member being attached to can be prevented.

In the main cover body 11, at the top part 14 forming the bottom surface of the vessel shape, a hinge 15 is formed and extends linearly, crossing that top part 14. The hinge 15 exhibits elasticity wherewith the width in a direction crossing that hinge 15 can be reduced by a pressing force from that crossing direction toward that hinge, and wherewith that width is restored to the original width when the pressing force is released. In order that such elasticity be imparted thereto, the hinge 15 is formed of a thinner material than are the other portions of the main cover body 11. Because the hinge 15 of the main cover body 11 exhibits such elasticity, even if the width of that main cover body 11 in the crossing direction is made larger than the width of the attachment hole in the member being attached to and the inside of the main cover body is made the same size or a larger size than the width of the attachment hole, the width of the main cover body 11 can be reduced to permit insertion when inserting it in the hole in the member being attached to, the inside of the main cover body 11, when the pressing force ceases after attachment, will secure space for a moving part such as the end 2 of the suspension arm, and the size of the hole 5 in a member being attached to such as an automobile body or the bracket 3 can be made small. The hinge 15 made of thin material, moreover, may extend not only to the top part 14 forming the bottom surface of the vessel shape, but may extend further, beyond the top part 14, to a position adjacent to the flange formed in the peripheral edges in the end edges of the main cover body 11, as shown in dashed lines in FIG. 1.

As described above, the main cover body 11 of the cover 9 is formed in a vessel shape, as viewed externally, that is substantially a rectangular parallelepiped shape, corresponding to the substantially rectangular hole 5 of the bracket 3 (the member being attached to), so as to seal that rectangular hole 5. The hinge 15 is formed so as to extend parallel to the long sides of the rectangular parallelepiped, substantially across the center of the top part 14 constituting the vessel bottom surface. The main cover body 11 is formed so that the width thereof on the inside in the direction of the short sides of the rectangular parallelepiped, when the pressing force is not operative, is larger than the width in the direction of the short sides of the hole 5 in the bracket 3 (width Z in FIG. 7). For that reason, when the pressing force is not operative, the outside width in the direction of the short sides of the rectangular parallelepiped (width X in FIGS. 5 and 7) is formed larger than the width in the direction of the short sides of the hole 5 in the bracket 3 (width Z in FIG. 7). As a consequence, the space 10 inside the cover 9 can largely secure space wherein the end 2 of the suspension arm can move. The space 10 can be made large, to such extent that the movement of the end 2 of the suspension arm is not impeded, as a consequence whereof the hole 5 in the bracket 3 can be made small. By making the hole 5 small, loss of rigidity in the bracket 3 (the member being attached to) can be prevented.

Between the flange 13 and the end edges at the two long sides of the main cover body 11, long narrow undercuts 17 are formed, respectively. The end edges at the long sides of the main cover body 11 which are adjacent, respectively, to the two undercuts 17 are formed as latching shoulders 18 for latching to the edges of the hole 5 in the bracket 3 (the member being attached to). On the inner wall surfaces of the main cover body 11 where the latching shoulders 18 are formed, a pair of ribs 19 may be formed for reinforcing the latching shoulders 18. The undercuts 17 may be formed as long narrow holes, or, alternatively, as long narrow concavities connected by thin material between the flange 13.

Making reference to FIGS. 6 and 7, the operation of attaching the cover 9 to the attachment hole 5 in the bracket 3 that is the member being attached to which is secured to the automobile body (not shown) is now described. As diagrammed in FIG. 6, the cover 9 is oriented toward the hole 5, and inserted in the hole 5 by the vessel-shaped main cover body 11, as indicated by the arrow 21, to seal the hole 5. As diagrammed in FIG. 7, the main cover body 11 is formed so that, when there is no pressing force to reduce the width in a direction crossing the hinge 15, the width X in the direction crossing the hinge 15 is larger than the opening width Z in the direction of the short sides of the cover hole 5. When the main cover body 11 is inserted into the hole 5, the main cover body 11 is capable of being flexed, by the hinge 15, so that the width X is reduced to a width corresponding to width Z (that is, to the width Y in FIG. 7), wherefore insertion will not be hindered by the width Z of the hole 5 being small. When the main cover body 11 is completely inserted in the hole 5, the flange 13 will be flush up against the peripheral edge portion of the hole 5, blocking further insertion. When the main cover body 11 is completely inserted in the hole 5, the undercut 17 portions adjacent to the flange 13 will be facing the outer edges of the hole 5, the pressing force against the main cover body 11 will be eliminated, and the width of the main cover body 11 will return to the original width X (or to a width close to the width X), due to the elasticity of the hinge 15, whereupon the space 10 inside the main cover body 11 can be secured larger than the width Z of the hole 5. When the main cover body 11 is completely inserted in the hole 5 and the undercuts 17 are facing the outer edges of the hole 5, furthermore, the latching shoulders 18 will latch to the edges of the hole 5, and the cover 9 will be secured to the bracket 3 so as to seal the hole 5. The ribs 19 maintain the strong latching force of the latching shoulders 18.

FIG. 8 diagrams how a moving part such as the end 2 of a suspension arm, for example, is accommodated in the space 10 inside the hole-sealing cover 9 attached to the bracket 3 that is secured to the automobile body 1, without the movement thereof being impeded. As diagrammed in FIG. 8, the width X' of the main cover body 11 forming the space 10 wherein the end 2 can move is returned by the elasticity of the hinge 15 to the original width X or to a width close to the width X. As already described, the width X of the main cover body 11 becomes larger than the width Z of the opening of the hole 5 in the bracket 3. As a consequence, the space 10 wherein the end 2 can move is secured larger than a space corresponding to the width Z of the hole 5.

Figure 9:
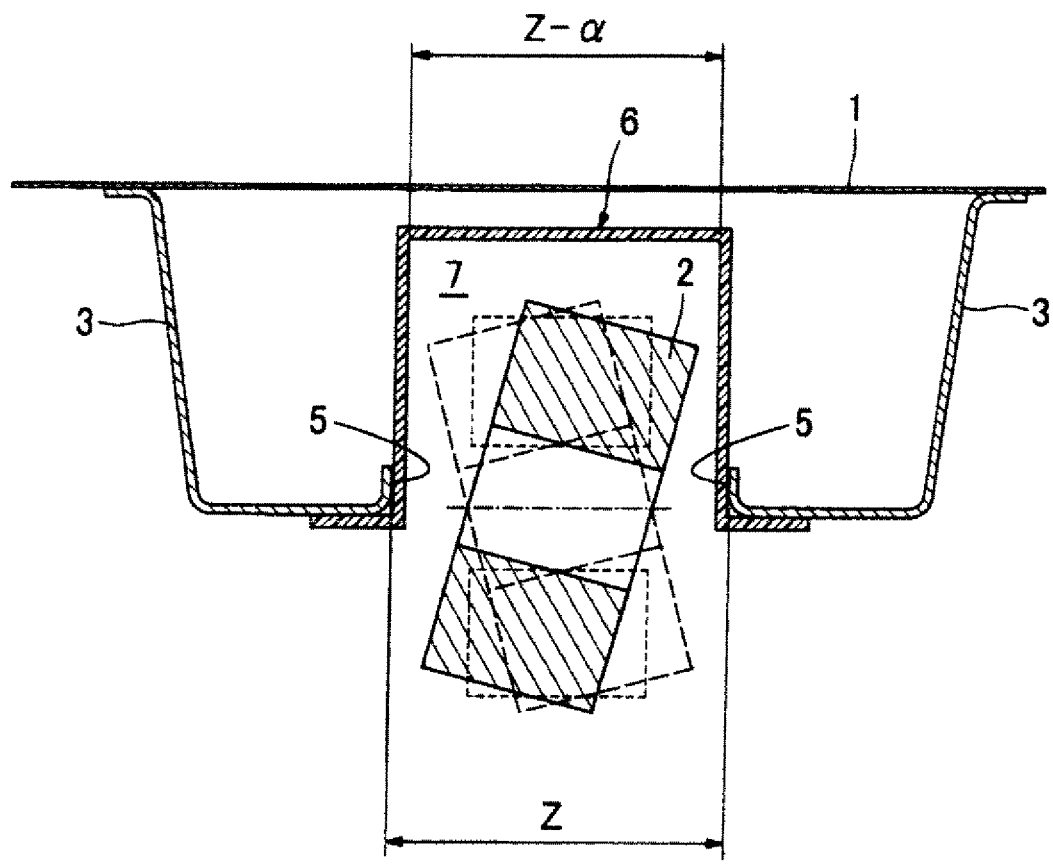
FIG. 9 is a section showing how a conventional cover is attached to a bracket secured to a automobile body.

In the conventional cover 6 diagrammed in FIG. 9, the movement space 7 provided by the cover 6 becomes smaller than the width Z of the hole 5 by the combined thickness α of the two walls of the cover 6. Accordingly, the hole-sealing cover relating to the present invention, in contrast with the conventional cover 6, can secure a larger movement space for a moving part such as the end 2 of a suspension arm, as a consequence whereof the hole 5 can be made smaller, movement of the end 2 will not be hindered, and loss of rigidity in the bracket 3 (the member being attached to) can be prevented.

While the present invention has been particularly shown and described with reference to exemplary embodiments thereof, it will be understood by those of ordinary skill in the art that various changes in form and details may be made therein without departing from the spirit and scope of the exemplary embodiments of the present invention as defined by the following claims.

What is claimed is:

1. A cover for sealing a hole in a part of a vehicle suspension assembly, the cover comprising:
   a main body configured to be inserted into the hole in an insertion direction, the main body including a substantially rectangular and flat top wall on an inserted end in the insertion direction, and a vertical side wall, the top wall and side wall partially defining a unitary interior space with an open side in a second direction opposite to the insertion direction and configured to receive a moving member of the assembly;
   a flange extending outwardly horizontally from the main body around the open side, the flange configured to engage an edge of the hole to seal the assembly against the accumulation of dirt and other foreign material within the main body;
   an elastically deformable linear hinge formed on the exterior of the main body, the hinge comprising a concave ridge extending along a long axis of the top wall of the main body and projecting away from the open side of the main body and open into the unitary space, the hinge allowing the main body to be compressed in a width direction transverse to the hinge so that the width of the main body in the direction perpendicular to the hinge is decreased when the cover is subjected to a compressing force, the body returning to its original width in the direction perpendicular to the hinge when the compression force is removed and resuming its pressure against the flange to maintain the seal on the cover.

2. The cover according to claim 1, wherein the hinge comprises a section of reduced thickness.

3. The cover according to claim 2, wherein the main body further comprises four side walls extending from the top wall.

4. The cover according to claim 3, wherein the main body is substantially box-shaped.

5. The cover according to claim 4, wherein the flange extends from an open side edges of the side walls.

6. The cover according to claim 2, wherein the main body is substantially box-shaped and further comprises four side walls extending from the top wall; and
wherein the hinge extends along one of said side walls across the top wall and along another of said side walls opposite said one of said side walls.

7. The cover according to claim 1, further comprising an undercut formed between ends of at least one of the side walls and an inner edge of the flange, the undercut forming a portion of reduced width as compared to the width of the main body.

8. A cover assembly for use in a vehicular suspension assembly comprising:
a member with a rectangular hole;
a cover configured as insertable in an insertion direction into the hole to seal the hole;
wherein the cover comprises a rectangular solid main body portion including a substantially rectangular flat top wall on an inserted end in the insertion direction and four side walls and defining an open side opposite to the top wall, and the main body portion partially defines a unitary interior space that is open at the open side in a second direction opposite to the insertion direction, and an outwardly extending flange extends from an open side edge of the side walls and is engaged with an edge of the hole;
wherein the cover further comprises an elastically deformable linear hinge located on the exterior of the main body, the hinge comprising a concave ridge extending along a long axis of the top wall of the main body and projecting away from the open side of the main body and open into the unitary space, which allows a decrease in a width of the cover main body in a direction perpendicular to the hinge when subjected to a compressive force such that the main body portion width in the direction perpendicular to the hinge has a first value when it is in a relaxed state and a second value less than the first value when subjected to the compressive force, said main body width resuming its first value after the compressive force is removed to restore the sealing force against the flange;
wherein the first value is greater than a width of the hole and wherein the second value is equal to or less than the width of the hole whereby the main body can be inserted into the hole by being compressed to the second value.

9. The cover assembly according to claim 8, wherein the main body has a width greater than the second value when the cover is in a fully inserted position in the hole.

10. The cover assembly according to claim 8, wherein the main body has the first value when the cover is in a fully inserted position in the hole.

11. The cover assembly according to claim 9, wherein the cover further comprises undercuts formed between at least portions of the an inner edge of the flange, the undercuts having a width less than the width of the main body and engaging an edge of the hole when the cover is in the fully inserted position.

12. The cover assembly according to claim 8, wherein the cover assembly further comprises a movable part which is movable in a space defined by the cover main body.

13. The cover according to claim 12, wherein the part is an automobile body part.

14. The cover according to claim 8, wherein the hinge comprises a portion with a thickness which is reduced as compared to other portions of the main body.

15. A cover for sealing a hole in a part that is part of a vehicular suspension assembly, the cover comprising:
a main body portion inserted in an insertion direction into the hole and the main body portion includes a substantially rectangular flat top wall on an inserted end in the insertion direction and four side walls defining an open side opposite to the top wall, and the main body portion partially defines a unitary interior space in the form of a rectangular solid that is open at the open side in a second direction opposite to the insertion direction, and main body portion further includes an outwardly extending flange extending from an open side edge of the side walls and configured to engage an edge of the hole to seal the hole and to prevent foreign material from accumulating in the hole;
an elastically deformable elongated hinge located on the exterior of the main body on the surface most remote from the hole, the hinge comprising a concave ridge extending along a long axis of the top wall of the main body and projecting away from the open side of the main body and open into the unitary space, the hinge allowing a decrease in a width of the cover main body in a direction perpendicular to the hinge when the main body is subjected to a compressive force such that the width of the main body portion in the perpendicular direction has a first value when it is in a relaxed state and a second value less than the first value when subjected to the compressive force;
wherein the first value is greater than a width of the hole and wherein the second value is equal to or less than the width of the hole whereby the main body can be inserted into the hole by being compressed to the second value and wherein the pressure due to the relaxation and expansion of the main body to its normal state restores the seal.

16. The cover assembly according to claim 15, wherein the main body has a width greater than the second value when the cover is in a fully inserted position in the hole.

17. The cover assembly according to claim 15, wherein the main body has the first width value when the cover is in a fully inserted position in the hole.

18. The cover assembly according to claim 16, wherein the cover further comprises undercuts formed between at least portions of the an inner edge of the flange, the undercuts having a width less than the width of the main body and engaging an edge of the hole when the cover is in the fully inserted position.

19. The cover assembly according to claim 15, wherein the hinge comprises a portion with a thickness which is reduced as compared to other portions of the main body.

* * * * *